US 11,793,206 B2

(12) United States Patent
Kulhei

(10) Patent No.: US 11,793,206 B2
(45) Date of Patent: Oct. 24, 2023

(54) REMOVAL DEVICE FOR ROD-LIKE ELEMENTS

(71) Applicant: Poly-clip System GmbH & Co. KG, Hattersheim (DE)

(72) Inventor: Stefan Kulhei, Ranstadt (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 209 days.

(21) Appl. No.: 16/860,684

(22) Filed: Apr. 28, 2020

(65) Prior Publication Data

US 2020/0337319 A1 Oct. 29, 2020

(30) Foreign Application Priority Data

Apr. 29, 2019 (EP) ..................................... 19171636

(51) Int. Cl.
*A22C 11/00* (2006.01)
*B65G 65/08* (2006.01)

(52) U.S. Cl.
CPC ............ *A22C 11/008* (2013.01); *B65G 65/08* (2013.01)

(58) Field of Classification Search
CPC ... A22C 11/008; A22C 15/002; B65G 47/088; B65G 15/12; B65G 17/40; B65G 17/005
(Continued)

(56) References Cited

U.S. PATENT DOCUMENTS

| | | | | |
|---|---|---|---|---|
| 3,363,743 | A * | 1/1968 | Pfeiffer ................. | B21B 39/004 118/423 |
| 10,053,300 | B2 * | 8/2018 | Itoh ........................ | B65G 15/12 |
| 2003/0098213 | A1 * | 5/2003 | Doornbos ............. | F16D 41/206 192/81 C |

FOREIGN PATENT DOCUMENTS

| | | |
|---|---|---|
| EP | 0417451 A1 | 3/1991 |
| EP | 1891859 A2 | 2/2008 |

(Continued)

OTHER PUBLICATIONS

EPO; 19171636.4 Extended European Search Report dated Oct. 17, 2019.

(Continued)

*Primary Examiner* — Ronald P Jarrett
(74) *Attorney, Agent, or Firm* — Fitch, Even, Tabin & Flannery LLP

(57) ABSTRACT

The present invention relates to a device for removing a rod-like element, like a smoking rod, from a loading zone of a hanging line, wherein the rod-like element is arranged in a loading position of said loading zone, in which the rod-like element can successively be loaded with sausage-shaped products, like sausages, each of which contain a flowable filling material in a tubular or bag-shaped packaging casing provided with a suspension element, like a suspension loop, through which the sausage-shaped products can be suspended on the rod-like element in the loading position. The device comprises discharge means for discharging the loaded rod-like element out of the loading zone of the hanging line in a discharge direction and transfer means being reversibly movable in a transfer direction between an engagement position in which the transfer means engage the rod-like element to be removed from the loading position, and a retracted position in which the loaded rod-like element is transferred to said discharge means. The device further comprises a drive assembly having a single drive device and transmission means for intermittently driving the discharge means in a discharge direction, and for reversibly driving the transfer means in the transfer direction between the engagement position and the retracted position.

13 Claims, 6 Drawing Sheets

(58) Field of Classification Search
USPC ..... 452/30, 51; 414/746.7; 198/612, 803.13, 198/817
See application file for complete search history.

(56) References Cited

FOREIGN PATENT DOCUMENTS

EP         1985185 A1   10/2008
WO         92/03929 A1   3/1992

OTHER PUBLICATIONS

EPO; Application No. 19171636.4; Communication pursuant to Article 94(3) EPC; dated May 20, 2022.

\* cited by examiner

REMOVAL DEVICE FOR ROD-LIKE ELEMENTS

CROSS-REFERENCE TO RELATED APPLICATION

The present application claims the benefit of priority of European Patent Application No. 19171636.4 filed on Apr. 29, 2019, the contents of which are incorporated herein by reference in their entirety.

FIELD OF THE INVENTION

The present invention relates to a device for removing a rod-like element, like a smoking rod, from a loading zone of a hanging line, with the rod-like element being arranged in a loading position of said loading zone in which the rod-like element can successively be loaded with sausage-shaped products, like sausages, each of which contain a flowable filling material in a tubular or bag-shaped packaging casing provided with a suspension element, like a suspension loop, through which the sausage-shaped products can be suspended on the rod-like element in the loading position. The device comprises discharge means for discharging the loaded rod-like element out of the loading zone of the hanging line in a discharge direction, and transfer means being reversibly movable in a transfer direction between an engagement position in which the transfer means engage the rod-like element to be removed from the loading position, and a retracted position in which the loaded rod-like element is transferred to said discharge means.

BACKGROUND OF THE INVENTION

In the production of sausage-shaped products, like sausages, a filling material is fed by a filling machine through a filling tube of the clipping machine into a tubular casing material stored on said filling tube. After a predetermined volume of filling material has been filled into said tubular casing material, the clipping machine closes the rear end of the sausage-shaped product via closing means, like closure clips, which are attached by respective closing tools. A suspension element, like a suspension loop, may also be attached to said rear end of said sausage-shaped product, enabling the sausage-shaped product to be hung up or suspended e.g. on a smoking rod or the like. Afterwards, the sausage-shaped product just produced is separated from the remaining casing material by a cutting device of the clipping machine and is transferred or discharged out of the clipping machine to a handling device for the next treatment step or a storage device by a respective discharge device.

For storing the sausage-shaped product on a smoking rod provided in a loading position of a hanging line, the suspension element is grabbed or picked-up by a transport device which removes the sausage-shaped product from a take-up position formed for example by an infeed device, and which may include a conveyor chain having suspension hooks. The sausage-shaped product, while hanging on the suspension hook, is than guided with its suspension element over the smoking rod and placed on a desired storage place on the smoking rod. When the smoking rod in the loading position is completely loaded, it is moved out of the loading position and an empty smoking rod is placed to be filled next.

A known hanging line for storing sausages is disclosed in EP patent application 1 891 859. The sausages which are produced in a known clipping machine include a suspension loop that is guided along a rod-shaped element or sword. A chain conveyor is partially arranged above the sword and engages the loops by means of hooks arranged at the conveyor chain such that the respective sausage hangs on said hook by its loop. The loop caught by a hook is spread and guided over the smoking rod. A release mechanism causes the hook to releases the loop at a desired place on the smoking rod. After a predefined number of sausages are placed on the smoking rod, the filled smoking rod is replaced by an empty smoking rod.

In this known hanging line, several drives are provided for moving the various components of the hanging line, particularly, the different components for removing the filled smoking rod from the loading position, like the several discharge conveyors and the chain conveyors. A mismatch between these components would lead to an incorrect removal of the filled smoking rod, and thus, it would cause production losses. Accordingly, an increased control effort is necessary to guarantee a correct synchronisation of the various components of these known hanging lines.

Thus, it is an object of the present invention to overcome the above-mentioned drawbacks, and to provide a removal device for rod-like elements, that is operable with a reduced control amount.

SUMMARY OF THE INVENTION

According to the present invention, there is provided a device for removing a rod-like element, like a smoking rod, from a loading zone of a hanging line, with the rod-like element being arranged in a loading position of said loading zone in which the rod-like element can successively be loaded with sausage-shaped products, like sausages, each of which contain a flowable filling material in a tubular or bag-shaped packaging casing provided with a suspension element, like a suspension loop, through which the sausage-shaped products can be suspended on the rod-like element in the loading position. The device comprises discharge means or a discharge unit for discharging the loaded rod-like element out of the loading zone of the hanging line in a discharge direction and transfer means or a transfer unit being reversibly movable in a transfer direction between an engagement position in which the transfer means or transfer unit engage the rod-like element to be removed from the loading position, and a retracted position in which the loaded rod-like element is transferred to said discharge means or discharge unit. The inventive device further comprises a drive assembly having a single drive device and transmission means or a transmission assembly for intermittently driving the discharge means in the discharge direction, and for reversibly driving the transfer means in the transfer direction between the engagement position and the retracted position.

By providing a drive assembly having a single drive device, it is possible to drive both the intermittently moving discharge means and the reversibly moving transfer means, and it allows thus the reduction of control effort as well as a reliable synchronisation of the movement of the discharge means and the transfer means.

The single drive device may be realized in different ways. The drive device may be a pneumatic or hydraulic drive device. However, in a preferred embodiment, the single drive device is a servo motor which may easy be coupled to and controlled by a control unit, and which may very precisely be activated.

It is further preferred that the transfer means are reversibly moved by reversing the single drive device. This allows an exact positioning of the transfer means in its extreme positions.

Particularly when the single drive device are realized by a servo motor, it is further possible to move the transfer means in any intermediate positions between said extreme positions, whereby the time for removing the loaded rod-like element from the loading position may be optimized.

Further advantageously, the transfer means may be arranged in a standby position close to the rod-like element in the loading position, which allows a further reduction of the time necessary for removing the loaded rod-like element from the loading position.

In a preferred embodiment, the transmission means include a free run for intermittently driving the discharge means. The free run allows the discharge means to be moved in the discharge direction when the single drive means is driven in the one direction, whereas the discharge device remains in its position during the reversal movement of the single drive device.

In order to guarantee that the transfer means securely pick-up or grab the rod-like element to be removed from the loading position, it is of advantage that the transfer means include at least one engagement element reversibly movable between an extended position and a retracted position. The engagement element, while passing the rod-like element in the loading position, is moved into the retracted position, and after having passed the rod-like element, it is moved into the extended position, in which the engagement element may come in contact with the rod-like element for moving out the rod-like element of the loading position.

It is further of advantage that the engagement element is a spring-loaded latch. The spring loaded latch may automatically be moved into the retracted position by passing the rod-like element, and may also automatically be moved into the retracted position after having passed the rod-like element. Additionally, a separate drive for the engagement element, which has to be controlled in accordance with the movement of the transfer means, is not necessary.

In a preferred configuration of the inventive device, the transfer means comprise two at least substantially identical transfer devices which engage the rod-like element to be removed in the region of its ends, whereby the rod-like element may securely be removed from the loading position.

In a further preferred configuration, each transfer device includes a driving rack for linearly reversibly moving the transfer devices between the engagement position and the retracted position. The driving rack enables the linear movement of the transfer devices, preferably a linear movement in an at least substantially horizontal plane. Additionally, in combination with the inventive single drive device, it is possible to select the length of the linear movement of the transfer devices in accordance with production parameters, like the loading rate or the number of rod-like elements to be loaded in a predefined time interval.

For securely removing the loaded rod-like element out of the loading zone, it is preferred that the discharge means includes two identical discharge devices for supporting the loaded rod-like elements in the region of their ends and for removing the rod-like element out of the loading zone or the loading position, respectively.

The discharge devices may be realized in different ways. It is further preferred that each of the discharge devices includes an at least approximately horizontally arranged chain conveyor, on which a loaded rod-like element may securely be positioned for further transportation.

For synchronizing the movement of the transfer devices and/or the discharge devices, respective transmission element, like chains, or belts may be used. In an advantage configuration, the transmission means include coupling rods for synchronizing the movement of the transfer devices and the movement of the discharge devices. Coupling rods enable a slip free transmission of rotation, and require a minimum of installation space.

It is further of advantage that, for adapting the speed of the discharge means to the speed of the transfer means, the transmission means includes at least one transmission stage. The adaption of the speed of the discharge means to the speed of the transfer means ensures that a rod-like element to be discharged from the hanging line, is securely transferred from the transfer means to the discharge means.

The transmission ratio of the at least one transmission stage may be selected such that the discharge means and the transfer means run at identical speed. The transmission ration of the at least one transmission stage may be selected such that a reduction or an increase of speed is enabled or that the speed is maintained constant.

It has to be understood that only one transmission stage may be sufficient for providing a respective transmission ratio. Naturally, also more than one transmission stages may be provided, e.g. arranged one after the other, for realizing the respective transmission ratio. Moreover, the transmission stages may be established by similar elements, like gear wheels only, or chain dives only. However, it is also possible to combine transmission stages composed of different elements, like one transmission stage including a chain drive and a further transmission stage including two or more toothed wheels.

The transmission means may include known transmission elements, like gear wheels, belt drives or sprocket drives. In order to guarantee a constant gear ratio, the transmission means may include chain drives and/or gear wheels, which provide constant gear ratios without slip.

The inventive removing device may further comprise a clamping arrangement for securing the rod-like element to be loaded in the loading position. Such a clamping arrangement may secure the rod-like element in the loading position during the loading process, and may thereby ensure that the rod-like element is in the correct position for being removed by the removing device.

For securing the rod-like element in the loading position, the clamping arrangement may include any suitable securing means. In a preferred constitution, the clamping arrangement comprises a pusher device with a pusher drive and a pusher element. The pusher element may act on an end face of the rod-like element for pushing the rod-like element along its longitudinal axis against a counter surface, whereby also a correction of the position of the rod-like element may be executed.

In a further advantage configuration, the pusher element is interchangeable, and has an abutment surface specific to the shape of the rod-like element. The pusher element may thereby be selected to be adapted to a specific shape rod-like element, and via its axial extension length, also to the length of the rod-like element, at least in a selected range.

In order to increase safety of the removal process, the clamping arrangement may include a sensor device for detecting at least one position of the pusher element. Thereby, it may be ensured that the clamping arrangement, and particularly the pusher element, is out of engagement with the rod-like element, i.e. in a release position, while the rod-like element is removed from the loading position.

Naturally, the sensor device may include only one sensor element for detecting the pusher element in one of the positions, like the clamping position or the release position. However, the sensor device may also be provided with two or more sensor elements for detecting the pusher element in more than one position, like in the clamping position, the release position and possible intermediate positions. In an exemplary case, the removal process may already be started when the pusher element is sensed in an intermediate position, namely while being moved towards the release position, which may shorten the removal process.

Further advantages and preferred embodiments of the present invention will be described in the following together with the drawings listed below. The expressions "left", "right", "below" and "above" used in the following description are referred to the drawings in an alignment such that the reference numbers and the notation of the figures used can be read in normal orientation.

DETAILED DESCRIPTION

Figure 1:
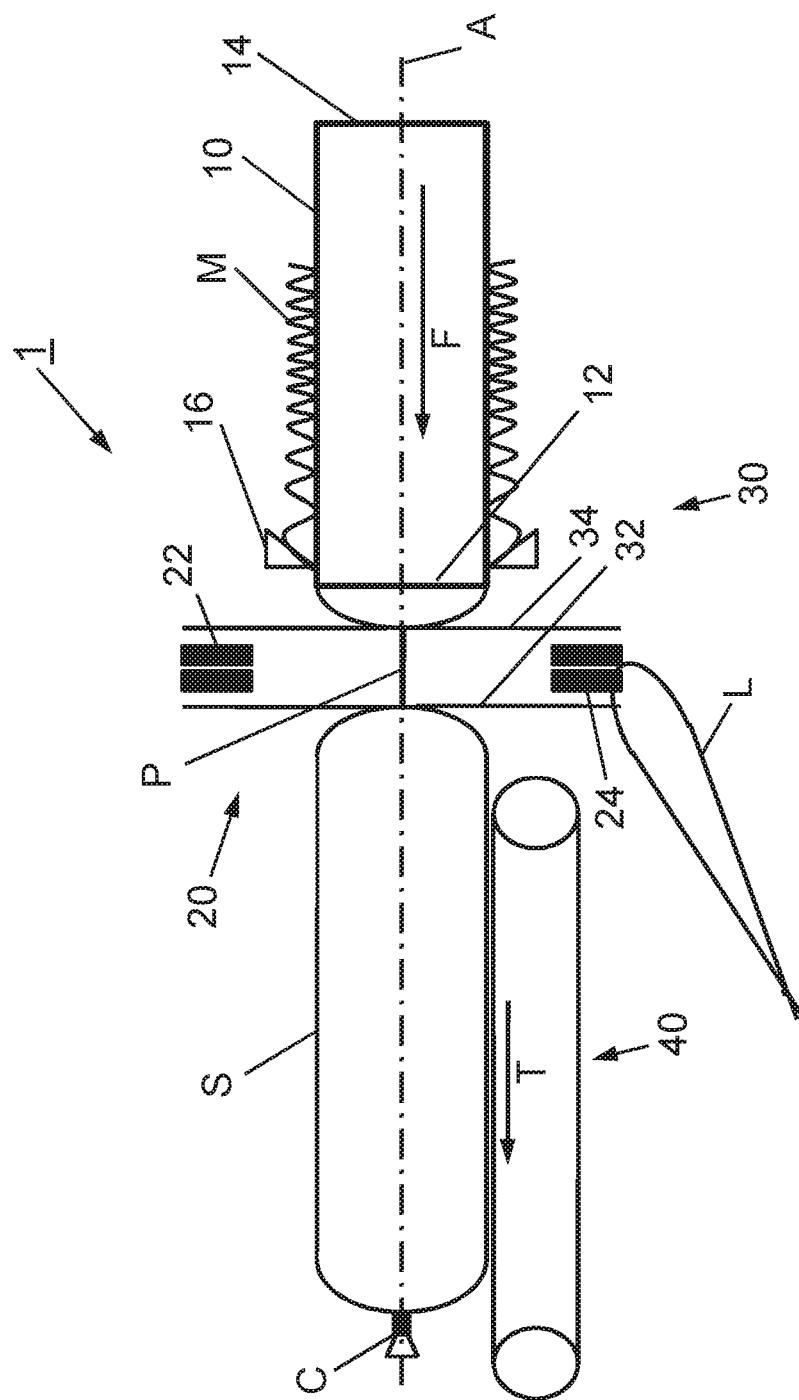
FIG. 1: is a schematic view showing the principal design of a clipping machine for producing sausage-shaped products.

A clipping machine 1 for producing sausage-shaped products S, like sausages, which contain a flowable filling material in a tubular or bag-shaped packaging casing M, is shown schematically in FIG. 1, in particular its closing region. Clipping machine 1 comprises a filling tube 10 having a longitudinally and horizontally extending central axis A, with a discharge opening for discharging the filling material at its left end 12 and a feeding opening for feeding the filling material in a feeding direction F to the discharge opening of filling tube 10, for example by a feeding pump (not shown), at its right end 14. Moreover, a casing brake assembly 16 is arranged on and coaxially with filling tube 10 in the region of the left end 12 of filling tube 10. Filling tube 10 is made of a suitable material, like stainless steel. A supply of tubular packaging casing M made of a thin sheet material is stored on filling tube 10 in a folded manner like a concertina. From the supply of tubular packaging casing M, tubular packaging casing M is pulled-off during the process of producing the sausage-shaped products S, in particular by the feeding pressure for filling the filling material into tubular packaging casing M wherein casing brake assembly 16 provides a braking force for allowing a controlled pulling-off of tubular packaging casing M during the filling process.

Clipping machine 1 further comprises a clipping device 20 for closing a filled tubular packaging casing M by applying closure means, like closure clips or closing clips C, to a plait-like portion P, and gathering means 30 for gathering the filled tubular packaging casing M and forming said plait-like portion P thereto. These components are all arranged downstream filling tube 10.

As can be inferred from FIG. 1, clipping device 20 is positioned immediately downstream left end 12 of filling tube 10, and coaxially aligned to filling tube 10. Clipping device 20 comprises a first and a second clipping tool 22, 24 formed by a punch 22 and a die 24. It has to be noted that punch 22 and die 24 may apply and close a single closure clip C for closing the just filled tubular packaging casing M, or may apply and close two closure clips C at the same time, a first closure clip C for closing the rear end of the just filled tubular packaging casing M for forming a sausage-shaped product S, and a second closure clip C for closing the front end of a tubular packaging casing M subsequently to be filled.

Gathering means 30 include a first displacer unit 32 and a second displacer unit 34, wherein first displacer unit 32 is positioned downstream second displacer unit 34. First and second clipping tools 22, 24 of clipping device 20 may be positioned between first and second displacer units 32, 34, at least for applying and closing one or two closure clips C to plait-like portion P. First displacer unit 32 can reversibly be moved parallel to feeding direction F of the filling material.

If it is intended to store the sausage-shaped products S on a rod-like element, like a smoking rod, e.g. for further processing like cooking or smoking, a suspension element L, like a suspension loop, may be provided and attached to one end of each of the sausage-shaped products S, or at one end of a chain of sausage-shaped products. Suspension element L may be fed to one of closing tools 22, 24, and may be fixed to the respective end of sausage-shaped product S by means of the closure clip C which closes said end of sausage-shaped product S.

For discharging a sausage-shaped product S just produced from clipping machine 1 in a transportation direction T being substantially the same as feeding direction F, a discharge device 40 is arranged downstream clipping device 20, which may be a belt conveyor comprising a conveyor belt and guide rollers. In a simple case, discharge device 40 may be a chute.

For storing sausage-shaped products S on a rod-like element, suspension element L is caught by a catching device, like a catching needle, which guides suspension element L towards the rod-like element. The rod-like element is normally horizontally arranged and aligned in transportation direction T, for securely receiving suspension element L.

Figure 2:
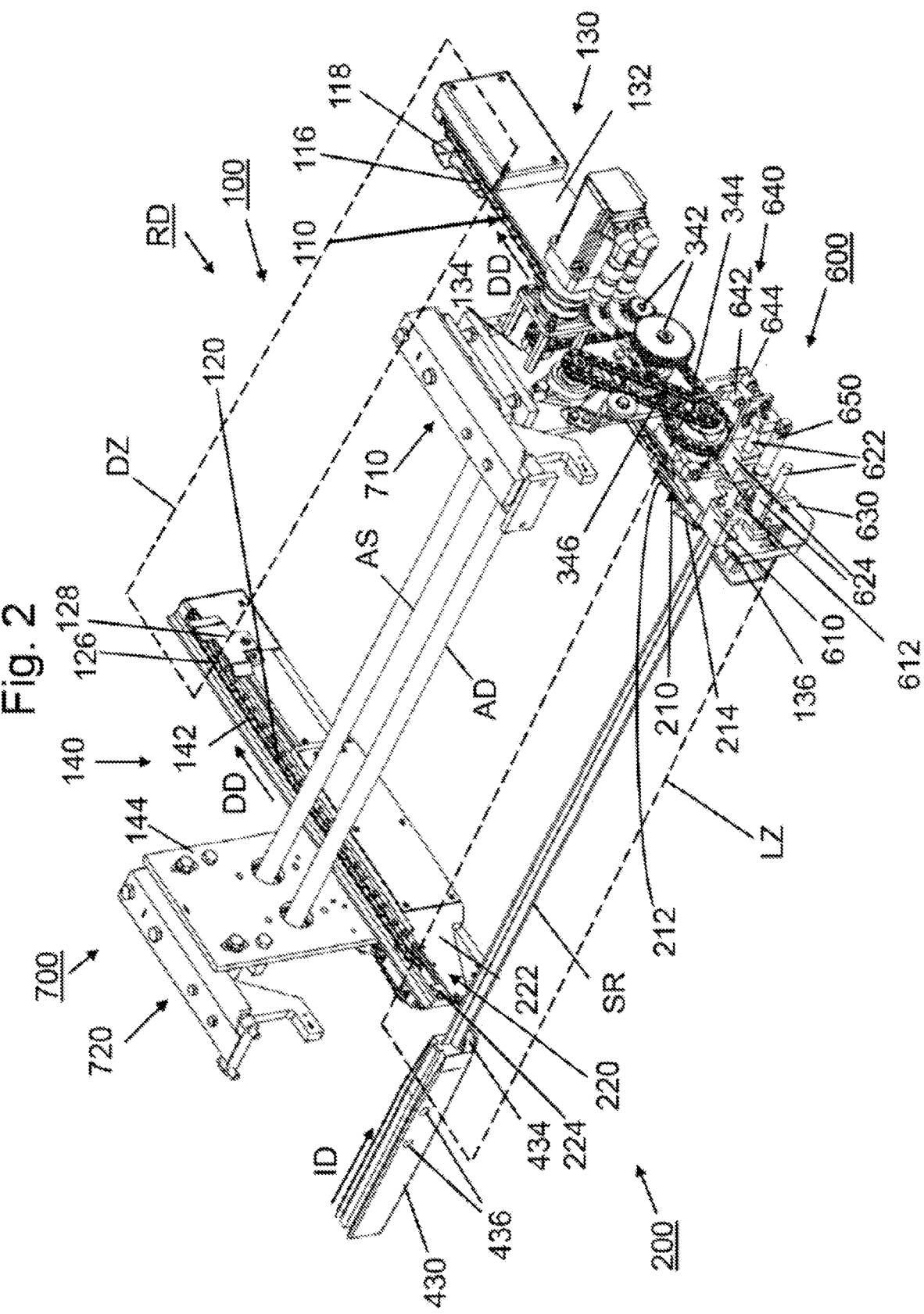
FIG. 2: is a perspective view to the rear side of the removal device according to the present invention, and in a direction contrary to the infeed direction.

FIG. 2 is a perspective view to the rear side of the device RD for removing a rod-like element SR, like a smoking rod, out of a loading zone LZ of a hanging line according to the present invention, and in a direction contrary to the infeed direction ID.

The device for removing rod-like element SR out of the loading position, or removal device RD, according to FIG. 2, is a component of an apparatus for suspending sausage-shaped products S by their suspension elements L on rod-like elements SR, like a hanging line in which sausages are suspended by their suspension loops on smoking rods. Naturally, in an apparatus for suspending sausage-shaped products by their suspension elements on rod-like elements, not only sausages may be handled. Any other products or packaging which are provided with a suspension element may be treated in such an apparatus.

By means of removal device RD, a rod-like element SR loaded with a predefined number of sausage-shaped products S, is removed from the loading position in the loading zone LZ and transferred to a discharge zone DZ in the region of the end of discharge means 100 facing away from loading zone LZ.

Removal device RD comprises discharge means or a discharge unit 100 for discharging the loaded rod-like element out of the loading zone and transfer means or a transfer unit 200 for removing rod-like element SR from the loading position, and placing said rod-like element SR on that end of discharge means 100 that faces towards loading zone LZ.

Discharge means 100 includes a first discharge device 110 and a second discharge device 120. Discharge devices 110, 120 are of identical configuration. Thus, identical components and elements of first and second discharge devices 110, 120 are provided with identical reference signs but increased by 10 for second discharge device 120.

Figure 3:
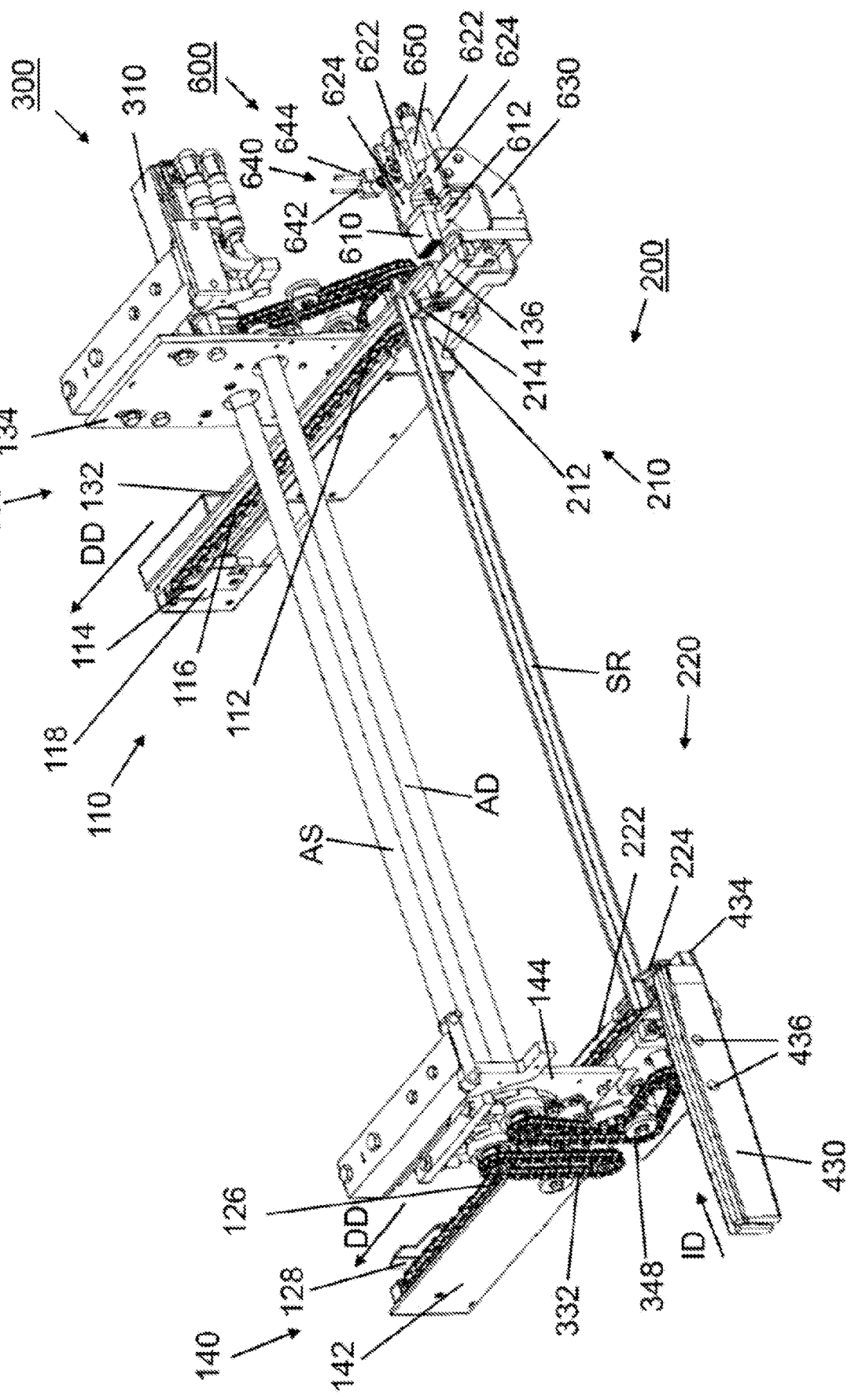
FIG. 3: is a perspective view to the rear side of the removal device of FIG. 2, and in infeed direction.

Discharge devices 110, 120 are embodied as horizontally arranged chain conveyors each having a first deflection roller 112, 122, a second deflection roller 114, 124 and a conveyor chain 116, 126 wound about first and second deflection rollers 112, 122; 114, 124 which are realized as sprocket wheels (cf. FIG. 3). The elements of first discharge device 110 are carried by a frame element 132 of a first frame assembly 130, and the elements of second discharge device 120 are carried by a frame element 142 of a second frame assembly 140.

Discharge devices 110, 120 are arranged at least approximately parallel to each other, and extend into loading zone LZ with their first ends formed by first deflection rollers 112, 122, and into discharge zone DZ with their second ends formed by second deflection rollers 114, 124. In order to prevent a loaded rod-like element SR transferred into discharge zone DZ from falling off from first and second discharge devices 110, 120, stopper elements 118, 128 are provided at the ends of the upper runs of conveyor chains 116, 126 at second ends of discharge devices 110, 120, which extend into discharge zone DZ. Stopper elements 118, 128 may just stop further transport of loaded rod-like elements SR and/or may be provided with sensor elements which may detect the presence of a loaded rod-like element SR, and which may output a corresponding signal e.g. to an operator.

The distance between first and second discharge devices 110, 120 is selected such that a rod-like element SR when arranged perpendicular to first and second discharge devices 110, 120, rests with its one end on first discharge device 110 and with its other end on second discharge device 120.

Transfer means 200 of removal device RD comprise a first transfer device 210 and a second transfer device 220. Transfer devices 210, 220 are of identical configuration. Thus, identical components and elements are provided with identical reference signs but increased by 10 for second transfer device 220.

A transfer device 210, 220 has a transfer element 212, 222 which extends at least approximately horizontally, and which is arranged parallel to discharge device 110, 120, and in the region of first deflection roller 112, 122. Transfer devices 210, 220 face each other, which means that transfer devices 210, 220 are arranged on the "inner sides" of discharge devices 110, 120. One end of each transfer element 212, 222 extends into loading zone LZ, whereas the respective other end faces towards discharge zone DZ.

At the upper side of each transfer device 210, 220, and at that end which extends into loading zone LZ, an engagement element 214, 224 protrudes upwardly. Each engagement element 214, 224 is realized as a spring-loaded latch which is pushed in its protruding position, as shown in FIGS. 2 and 3, by a spring arranged inside transfer elements 212, 222. Engagement elements or latches 214, 224 may be pushed into transfer elements 212, 222 by an external force against the force of said spring, and after said pushing force is released, latches 214, 224 are automatically pushed into the protruding position by said spring.

Removal device RD further comprises a drive assembly 300 including a single drive device 310 and transmission means or transmission assembly 320 with a first transmission arrangement 330 and a second transmission arrangement 340.

Figure 4:
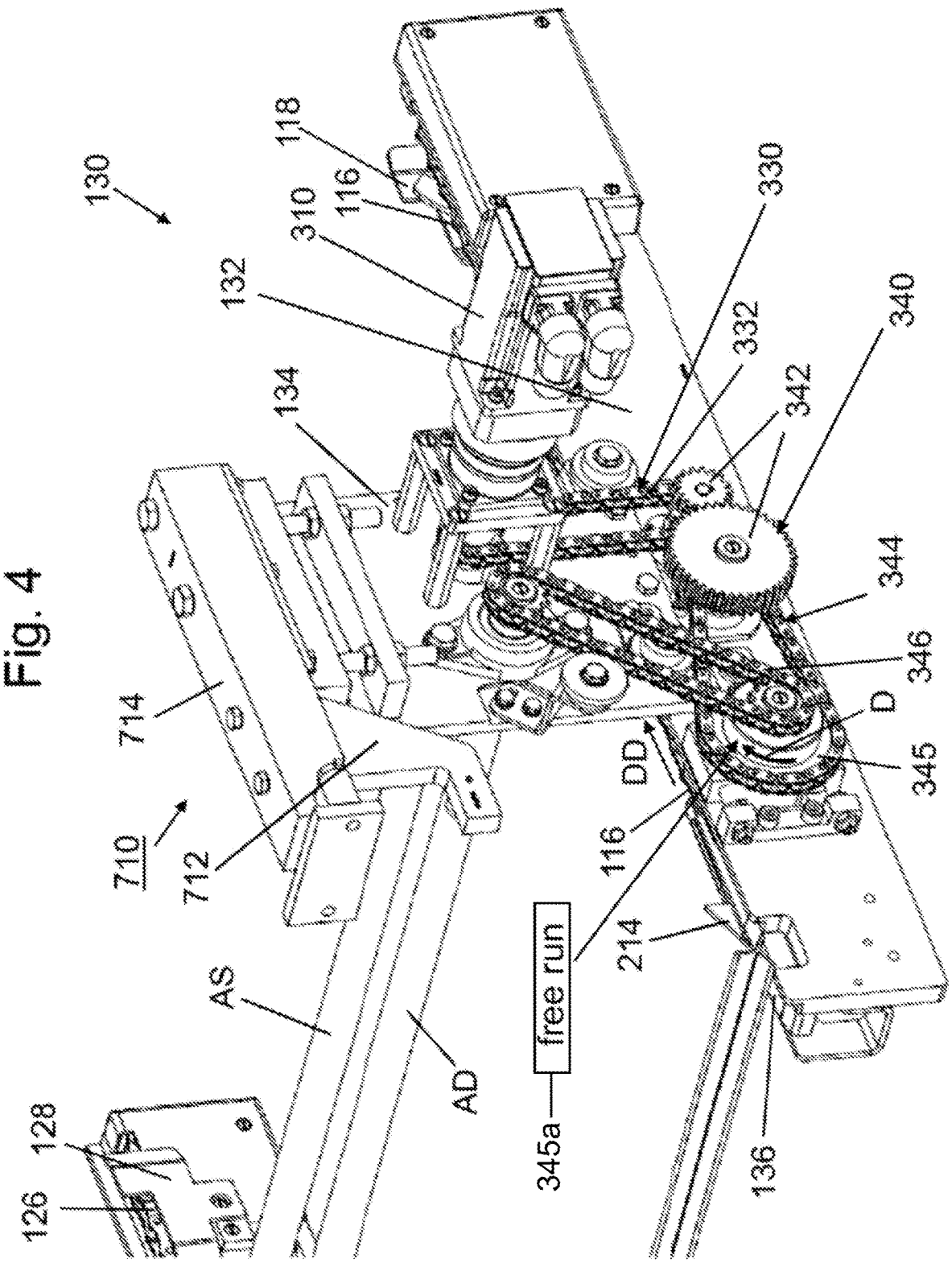
FIG. 4: is an enlarged view of the downstream end of the device of FIG. 2.

Single drive device 310, according to the embodiment shown in FIGS. 2 to 4, is a servo motor which may directly be controlled by the control unit of the apparatus for suspending sausage-shaped products S by their suspension elements L on rod-like elements SR. Naturally, the single drive device may also be any other suitable drive device, like hydraulic or pneumatic drive device. However, a servo motor may be controlled very precisely, and may e.g. drive in both directions, forwards and rearwards, and may be stopped at any predefined position.

Single drive device or servo motor 310 is coupled to transfer devices 210, 220 by a first transmission arrangement 330 of transmission means 320, for reversibly moving transfer devices 210, 220 between an engagement position in which transfer devices engage a rod-like element SR positioned in the loading position as shown in FIG. 2, and a retracted position in which said loaded rod-like element SR is released on the upper runs of conveyor chains 116, 126 of discharge devices 110, 120.

Single drive device or servo motor 310 is further coupled to discharge devices 110, 120 by second transmission arrangement 340, for driving discharge devices 110, 120, and particularly, the upper run of conveyor chains 116, 126, in a discharge direction DD, whereby a rod-like element SR positioned on discharge devices 110, 120 is transferred into discharge zone DZ.

Figure 5:
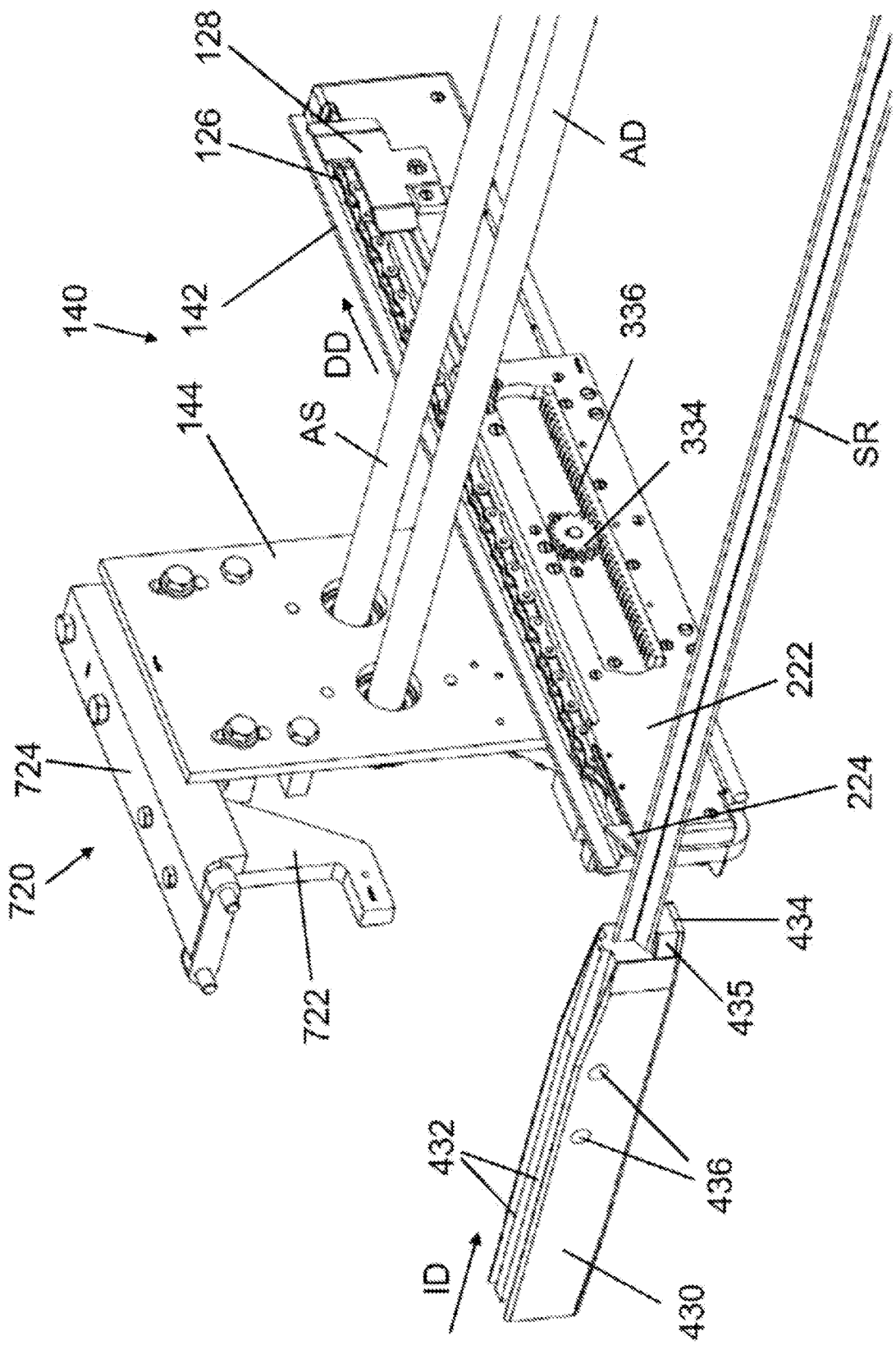
FIG. 5: is an enlarged view of the upstream end of the device of FIG. 2.

As particularly can be seen in FIGS. 3 to 5, transfer elements 212, 222 of transfer devices 210, 220 are provided with a horizontally extending slot in which a driving rack is arranged. A toothed wheel 334 engages said driving rack 336 for linearly driving transfer elements 212, 222. Toothed wheel 334 is coupled to an approximately vertically chain drive 332 which is directly driven by servo motor 310. The upper sprocket wheels of the chain drives 332 (cf. FIGS. 3 and 4) are arranged on a coupling rod AS extending horizontally and perpendicularly to discharge devices 110, 120, for synchronizing the movement of transfer devices 210, 220. Chain drives 332, toothed wheels 334 and driving racks 336 of first and second transfer devices 210, 220 as well as coupling rod AS form first transmission arrangement 330 of transmission means 320 for reversibly moving transfer devices 210, 220.

Second transmission arrangement 340, as shown in greater detail in FIG. 4, includes a first gear stage 342 including pair of toothed wheels, a first chain drive 344, a second chain drive 346, a third chain drive 348 (cf. FIG. 3) and a coupling rod AD.

First discharge device 110 is driven by servo motor 310 via first gear stage 342 and first chain drive 344. Second discharge device 120 is driven via its first deflection roller 122, the axis of which is coupled via third chain drive 348 (cf. FIG. 3), coupling rod AD and second chain drive 346 to the axis of first deflection roller 112 of first discharge device 110. Third chain drive 348, coupling rod AD and second chain drive 346 provide a 1:1 transmission of rotation, for synchronously driving first and second discharge devices 110, 120. In order to adapt the discharge speed or the speed of first and second discharge devices 110, 120 to the transfer speed or the speed of first and second transfer devices 210, 220, first gear stage 342 and first chain drive 344 provide a respective transmission ratio according to the size of the pair of tooth wheels forming first gear stage 342 and the size of the pair of sprocket wheels of first chain drive 344.

As particularly can be seen in FIG. 4, first gear stage 342 and first chain drive 344 reduce the rotational speed according to the ratio of the number of teeth and sprockets of the tooth wheels of first gear stage 342 and the sprocket wheels of first chain drive 344. However, dependent on the size of toothed wheels 334 co-acting with driving racks 336 for reversibly moving first and second transfer devices 210, 220, other transmission ratios for first gear stage 342 and first chain drive 344 may be selected. It has to be noted that the speed of first and second transfer devices 210, 220 and the speed of conveyor chains 116, 126 of first and second transfer devices 210, 220 should be at least approximately identical, in order to guarantee a safe transfer of a rod-like element R from first and second transfer devices 210, 220 to first and second discharge devices 110, 120.

First and second frame assemblies 130, 140 further comprises frame elements 134, 144 which extend upwardly from frame elements 132, 142. As particularly can be seen in FIGS. 3 and 4, servo motor 310 is mounted to frame element 134. Moreover, axles AS, AD are rotatably supported by respective bearings mounted to frame elements 134, 144.

First chain drive 344 has a sprocket wheel 345 which is arranged on the axis of first deflection roller 112 of first discharge device 110. By driven sprocket wheel 345 in a drive direction D, the axis of first deflection roller 112 and the sprocket wheel of second chain drive 346 that is arranged on the axis of first deflection roller 112, are driven in drive direction D with the same rotation speed. Thereby, first and second discharge devices are driven in discharge direction DD.

For preventing first and second discharge devices from being driven in the counter direction of drive direction D or discharge direction DD, respectively, particularly during the movement of first and second transfer devices towards the loading position in loading zone LZ, sprocket wheel 345 of second chain drive 344 includes a free run 345a which acts in the counter direction of drive direction D. This means that sprocket wheel 345, while being driven in drive direction D, also drives the axis of first deflection roller 112, and thus, also the axis of first deflection roller 122 of second discharge device is driven in drive direction D.

On the other hand, during a reversal movement of servo motor 310, for driving first and second transfer devices 210, 220 toward loading zone LZ, sprocket wheel 345 of first chain drive 344 is driven in the counter direction of drive direction D. The free run 345a in sprocket wheel 345 prevents the axis of first deflection roller 112 from being rotated in the counter direction of drive direction D, and thus, also second chain drive 346 is prevented from movement in the counter direction of drive direction D. Thereby, a movement of first and second discharge devices 110, 120 in the counter direction of discharge direction DD is prevented. And more precisely, the free run 345a in sprocket wheel 345 not only prevents a movement of first and second discharge devices 110, 120 in the counter direction of discharge direction DD, but it prevents any movement of first and second discharge devices 110, 120 during reversal drive of servo motor 310, whereby first and second discharge devices 110, 120 remain in their current position.

Sausage-shaped products S to be suspended on a rod-like element SR by their suspension elements L are transferred to the rod-like element SR positioned in the loading position by an infeed device 400 in an infeed direction ID. FIGS. 2, 4 and 5 show a rod-like element SR in the loading position.

Figure 6:
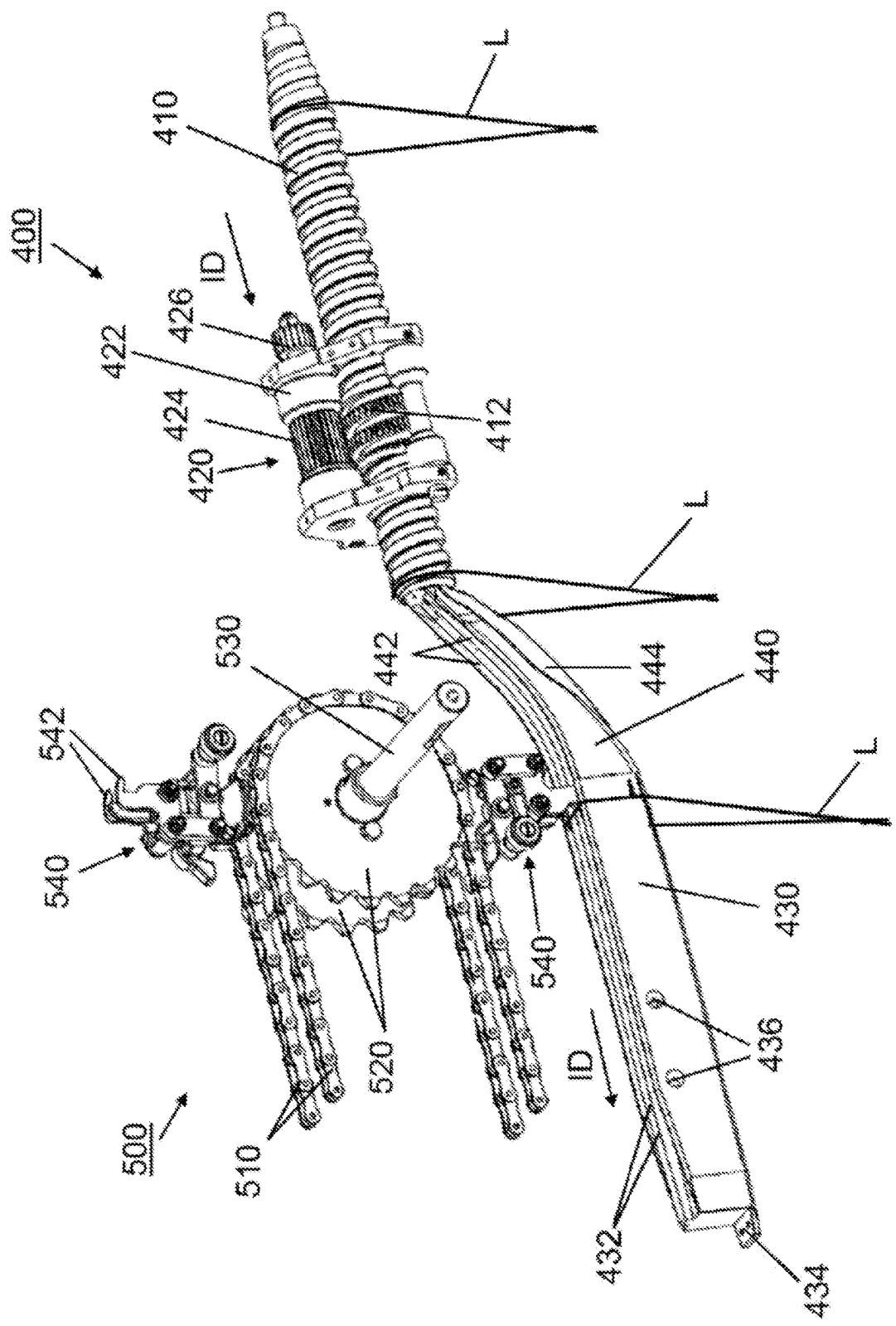
FIG. 6: is a perspective view of an infeed device which cooperates with the removal device according to the present invention.

FIG. 6 shows an exemplary embodiment of an infeed device 400 which includes an infeed conveyor in the form a spindle 410 with a screw on its outer surface, that is supported by a spindle bearing 420, a guide bar 430 and a connecting element 440 connecting the downstream end of screwed spindle 410 with the upstream end of guide bar 430. Connecting element 440 has the shape of a segment of a circle, at least at its upper surface. The upstream end of connecting element 440 has an approximately circular cross-section adapted to the cross-section of screwed spindle 410, to allow a sliding transfer of a suspension element L from screwed spindle 410 onto connecting element 440.

The downstream end of connecting element 440 has an at least approximately rectangular shape adapted to the cross-section of guide bar 430. In the upper surface of connecting element 440, two parallel grooves 442 are arranged, which extend in infeed direction ID. Also in the upper surface of guide bar 430, two parallel grooves 432 are arranged, which extend in infeed direction ID, and which are aligned with grooves 442 in connecting element 440.

A portion of the surface of screwed spindle 410 has a toothed surface 412 which is engaged by a toothed portion 424 of a support roller 422 of spindle bearing 420. At a free end of support roller 422, a toothed wheel 426 is arranged, via which support roller 422 may be rotated, for driving screwed spindle 420 at a desired speed.

For supporting guide bar 430, holes 436 are provided in both side surfaces of guide bar 430, into which indexing pins (not shown) may engage. At the upstream end, guide bar 430 is fixedly coupled to connecting element 440. The upstream end of connecting element is radially supported by grooved spindle 410. Connecting element 440 has an engaging element, like a pin, at its upstream end that extends into the downstream end of spindle 410, in which it is rotatably supported in a roller bearing for enabling a rotational movement of spindle 410 relative to connecting element 440. Pairs of oppositely arranged indexing pins which engage holes 436 in guide bar 430 provide radial and rotational support for guide bar 430, and enable passage of suspension elements L along guide bar 430, by pairwise alternatingly engaging and disengaging holes 436 in guide bar 430.

The longitudinal edges 444 of connecting element 440, which extend along its lower surface, are cut away, particularly, in the region of the upstream end of connecting element 440. These cutaways reduce the cross-sectional area in a vertical plane perpendicularly arranged to the longitudinal axis of crewed spindle 410. The reduction of the cross-sectional area prevents suspension elements L sliding from screwed spindle 410 along connecting element 440 towards guide bar 430 from sticking in this region of connecting element 440.

As further can be seen in FIG. 6, at its downstream end, a support element 434 extends from guide bar 430, for supporting a rod-like element SR to be loaded with sausage-shaped products S. A suspension element L guided along guide bar 430 may thereby be transferred onto said rod-like element. Additionally, as particularly can be seen in FIG. 5, for adapting the position of the rod-like element SR relative to guide bar 430, an adapter element 435 may be positioned on support element 434, to enable the use of rod-like elements SR with different cross-sectional shapes and sizes.

A transportation device 500 is arranged vertically above guide bar 440 and extends in infeed direction ID. Transportation device 500 is embodied as a chain conveyor having two endless conveyor chains 510 which are arranged parallel to each other, and with each conveyor chain 510 being wound about a first and a second deflection roller. In FIG. 6, only first deflection rollers 520 are shown, which are arranged on a common axle 530. First deflection rollers 520 form the upstream end of horizontally arranged transportation device 500. The downstream end of transportation device 500 is of identical constitution, and includes two second deflection rollers about which conveyor chains 510 are wound, and which are arranged on a common axle.

Transportation device 500, and particularly conveyor chains 510 are driven by one of axles 530 of the deflection rollers 520. Transportation device 500 is driven such that the lower run of conveyor chains 510 moves in infeed direction ID.

Transportation elements 540 are arranged in regular intervals on conveyor chains 510. Each transportation element 540 includes a pair of hooks 542, with each hook engaging one of grooves 442, 432 for engaging a suspension element L of a sausage-shaped product S to be suspended on a rod-like element SR.

The length of transportation device 500 is selected such that the lower run of conveyor chains 510 extends at least from the upstream end of guide bar 430 to first discharge device 110. Furthermore, in order to ensure a safe pick up of a suspension element L by a transportation element 540, the central axis of axle 530 coincides with the centre of the circle segment formed by the upper surface of connecting element 440.

In FIG. 6, only suspension elements L are shown, representing the sausage-shaped products S to be transported along infeed device 400.

The leftmost suspension element L is in the region of the take-up position at the upstream end of guide bar 430. For clarification matter only, the middle suspension element L is shown in a position at the downstream end of screwed spindle 410, where, by further rotation of screwed spindle 410, said suspension element L will be transferred onto connecting element 440, and further slide along connecting element 440 by gravity, into the take-up position to be picked up by the subsequent transportation element 540 which, in FIG. 6, is positioned vertically above common axle 530. With the leftmost suspension element L in the take-up position, middle suspension element L has a distance to the downstream end of spindle 410, such that said middle suspension element L is transferred onto connecting element 440 immediately before subsequent transportation element 540 passes the upstream end of connecting element 440.

A rod-like element SR to be loaded with sausage-shaped products S is positioned in the loading position in the loading zone LZ of an apparatus for suspending sausage-shaped products S by their suspension elements L on rod-like elements SR, like a hanging line for suspending sausages on smoking rods.

In the loading position as shown in FIG. 2, the upstream end of rod-like element SR is supported by a support element 434 of guide bar 430, which extends from the downstream end of guide bar 430, and the downstream end of rod-like element SR, when in the loading position, is supported by a support element 136 attached to frame element 132 of first frame assembly 130, such that a rod-like element SR in the loading position is arranged approximately horizontally and coaxially with guide bar 430.

For providing a safe transfer of a loaded rod-like element SR from the loading position on support elements 136, 434 onto discharge conveyors 110, 120, the upper surfaces of support elements 136, 434 on which a rod-like element SR rests while being loaded, are aligned to the upper surfaces of the upper runs of conveyor chains 116, 126.

For securing a rod-like element SR in the loading position, particularly during loading, a clamping device 600 is provided at that end of frame element 132 of first frame assembly 130 that extends into loading zone LZ, i.e. the first end of first discharge device 110.

Clamping device 600 has a clamping element or clamping block 610 which may be moved coaxially to a rod-like element SR in the loading position, and which acts on the downstream end surface of rod-like element SR, which faces in infeed direction ID. Clamping device 600 comprises a frame element 630 by which it is mounted to the downstream facing surface frame element 132 of first frame assembly 130. Clamping block 610 is fixed to a pusher plate 612 that is reversibly guided in infeed direction ID by a guide assembly 620 including two guide bars 622 guided in guide blocks 624 which are fixed to frame element 630. A drive device 650 includes a drive in the form of a piston/cylinder assembly with the cylinder being fixed to frame element 630 and the piston coupled to pusher plate 612, for positioning pusher block 610 in a clamping position in which clamping block 610 abuts the downstream end face of rod-like element SR, a retraced position, in which clamping block 610 is in its downstream most position. Clamping block 610 may also be positioned in any possible intermediate position between these two extreme positions. A sensor arrangement 640 is arranged at frame element 630 in order to detect the position of clamping block 610. In FIG. 6, two sensor elements 642, 644 are provided for detecting clamping block 610 via the position of one of the guide bars 622 in its extreme positions.

Naturally, only one sensor element may be sufficient to ensure that clamping block 610 is in the clamping position or out of the clamping position. A further sensor element for detecting clamping block 610 in an intermediate position may be used for reducing the time for loosening the rod-like element SR just filled and clamping the rod-like element SR subsequently to be filled.

Removal device RD further comprises attachment means or an attachment unit 700 for attaching removal device RD to a framework of an apparatus for suspending sausage-shaped products S by their suspension elements L on rod-like elements SR, like a hanging line in which sausages are suspended by their suspension loops on smoking rods. Attachment means 700 include a first and a second attachment device 710, 720, which are mounted to the upper ends of frame elements 134, 144 of first and second frame assemblies 130, 140. Each attachment device 710, 720 has an approximately C-shaped attachment portion 712, 722 by means of which removal device is attached to the framework of the hanging line, and an adjustment portion 714, 724 for adjusting removal device RD relative to the frame work of said hanging line. Adjustment portions 714, 724 may include adjustment elements, like adjustment screws and guide elements, for varying the horizontal or vertical position of removal device RD relative to the framework of the hanging line.

To suspend sausage-shaped products S by their suspension elements L on rod-like elements SR, the suspension element L is caught and transferred onto screwed spindle 410 of infeed device 400. While driving spindle 410, a sausage-shaped product S is transported along spindle 410. At the upstream end of spindle 410, the suspension element L of sausage-shaped product S slides along connecting element 440 towards the upstream end of guide bar 430.

Conveyor chains 510 of transportation device 500 are driven in infeed direction ID such that the suspension element L is engaged the hooks 542 of transportation element 540 and transported along guide element 430 and the rod-like element SR in the loading position.

During transporting sausage-shaped product S along rod-like element SR by transport element 540, a release device (not shown) moves a release element in the counter direction of infeed direction ID, which causes the transport element 540 to release the sausage-shaped product S from the hooks 542 at a predetermined position on rod-like element SR. Loading of rod-like element SR with sausage-shaped products S is thereby started at its upstream end, and sausage-shaped products S are subsequently placed on rod-like element SR in the counter direction of infeed direction ID.

After a predefined number of sausage-shaped products S has been suspended on rod-like element SR, servo motor 310 of drive assembly 300 is activated to rotate clockwise, e.g. when seen in FIG. 4. Thereby, also toothed wheel 334 rotates clockwise via chain drive 332 of first transmission arrangement 330, and moves transfer devices 210, 220 towards loading zone LZ (cf. FIG. 5).

At the same time, via first gear stage 342 and first chain drive 344 of second transmission arrangement 340, sprocket wheel 345 rotates counter clockwise and at a reduced speed according to the gear ratio of first gear stage 342 and first chain drive 344.

As explained above, a free run is arranged between sprocket wheel 345 and the axle of first deflection roller 112, which prevents the axis of first deflection roller 112 from being rotated in the counter direction of drive direction D.

While being moved towards the loading position, spring-loaded latches 214, 224 pass the underside of the loaded rod-like element SR in the loading position. Latches 214, 224, which way have an approximately triangular shape, are pushed into transfer elements 212, 222 by the weight of the loaded rod-like element SR. After having passed the loaded rod-like element SR, latches 214, 224 are pushed out of transfer elements 212, 222 by their spring load, and servo motor 310 is stopped.

Prior moving loaded rod-like element SR out of the loading position, clamping device 600 is activated to move clamping block 610 from the clamping position (cf. FIG. 2) into a retracted position (cf. FIG. 3).

Thereafter, servo motor 310 is driven counter clockwise. Via toothed wheel 334, transfer elements 212, 222 are moved in discharge direction DD. Together with transfer elements 212, 222, the loaded rod-like element SR is moved out of the loading position in discharge direction DD about a distance such that the loaded rod-like element SR is positioned on the first end of first and second discharge devices 210, 220 which extend into loading zone LZ.

At the same time, while servo motor 310 is rotated counter clockwise, sprocket wheel 345 of first chain drive 344 of second transmission arrangement 340 together with the axis of first deflection roller 112 is rotated clockwise in drive direction D, and thus, in the counter direction of the free run direction.

Accordingly, while servo motor 310 is driven clockwise, first and second discharge devices 110, 120 are driven in discharge direction DD. The loaded rod-like element SR moved out of the loading position by transfer means 200, is placed at the first end of discharge means 100 in the loading zone and is transported by discharge means 100 in discharge direction DD.

The distance about which transfer elements 212, 222 may be moved from the engagement position, in which they engage a loaded rod-like element SR in the loading position, to a retracted position in which the loaded rod-like element SR is released onto discharge means 100, is limited by the length of driving rack 336.

However, dependent on specific production or infeed parameters, like the loading speed or the number of sausage-shaped products S to be suspended on the rod-like element SR, the position in which the loaded rod-like element SR may be placed on transfer means 100, may vary, which means that the length of the moving path of transfer means 200 may be shorter than allowed by the maximum length of driving rack 336.

Additionally, after the loaded rod-like element SR is placed on discharge means 100, first and second transfer devices 210, 220 may be moved towards the loading position, until only a small gap remains between the ends of transfer elements 212, 222 and the rod-like element SR in the loading position, which is sufficient for a suspension element L to pass therethrough while loading said rod-like element SR (cf. FIG. 5), a so called standby position Thereby, the time for exchanging a loaded rod-like element SR by an empty rod-like element SR is reduced, since transfer devices 210, 220 have only to be moved a short distance, starting from the standby position, to remove the loaded rod-like element SR from the loading position.

After the next rod-like element SR is loaded with a predefined number of sausage-shaped products S, the next removal procedure may be started.

In conjunction with the embodiment of removal device RD according to FIGS. 2 to 5, the transmission means have been described as including chain drives having sprocket wheels and chains wound about said sprocket wheels. Naturally, the transmission means may include any suitable transmission devices, like belt drives including a drive belt wound about respective deflection rollers, or additional gear stages including two or more toothed wheels.

Also the discharge devices may include other than chain conveyors, like belt conveyors.

Furthermore, for reversibly moving transfer devices 210, 220, it is not necessary to provide a driving rack cooperating with a toothed wheel. Other drive assemblies may be used, which enable a linear and reversal movement of the transfer elements, like a crank drive.

Transportation device 500 as including conveyor chains with hooks arranged thereon, is also only one embodiment of a transportation device. Other elements or components may be used for transporting sausage-shaped products S from the guide bar to their position on the rod-like element, like a belt drive.

What is claimed is:

1. A device for removing a rod-element from a loading zone of a hanging line, wherein the rod-element is arranged in a loading position of said loading zone in which the rod-element can successively be loaded with sausage-shaped products, each of which contain a flowable filling material in a tubular or bag-shaped packaging casing provided with a suspension element through which the sausage-shaped products can be suspended on the rod-element in the loading position, the device comprises:
 a discharge unit for discharging the loaded rod-element out of the loading zone of the hanging line in a discharge direction;
 a transfer unit being reversibly movable in a transfer direction between an engagement position in which the transfer unit engages the rod-element to be removed from the loading position, and a retracted position in which the loaded rod-element is transferred to said discharge unit; and a drive assembly having a single drive device and transmission assembly for intermittently driving the discharge unit in the discharge direction, and for reversibly driving the transfer unit in the transfer direction between the engagement position and the retracted position, wherein the transfer unit is reversibly moved by reversing the single drive device, and wherein the transmission assembly includes a free run for intermittently driving the discharge unit, the free run allows the discharge unit to be moved in the discharge direction when the single drive device is driven in one direction, whereas the discharge unit remains in its position during the reversal movement of the single drive device.

2. The device according to claim 1,
wherein the transfer unit includes at least one engagement element reversibly movable between an extended position and a retracted position.

3. The device according to claim 2,
wherein the engagement element is a spring-loaded latch.

4. The device according to claim 1,
wherein the transfer unit comprises two at least substantially identical transfer devices which engage the rod-element to be removed in the region of its ends.

5. The device according to claim 4,
wherein each transfer device includes a driving rack for linearly reversibly moving the transfer devices between the engagement position and the retracted position.

6. The device according to claim 4,
wherein the discharge unit includes two identical discharge devices supporting the loaded rod-elements in the region of their ends, and
wherein the transmission assembly includes coupling rods for synchronizing the movement of the transfer devices and the movement of the discharge devices.

7. The device according to claim 1,
wherein the discharge unit includes two identical discharge devices supporting the loaded rod-elements in the region of their ends.

8. The device according to claim 7,
wherein each of the discharge devices includes an at least approximately horizontally arranged chain conveyor.

9. The device according to claim 1,
wherein the transmission assembly includes at least one transmission stage for adapting the speed of the discharge unit to the speed of the transfer unit.

10. The device according to claim 1,
further comprising a clamping arrangement for securing the rod-element in the loading position.

11. The device according to claim 10,
wherein the clamping arrangement comprises a pusher device with a pusher drive and a pusher element.

12. The device according to claim 11,
wherein the pusher element is interchangeable, and has an abutment surface specific to the shape of the rod-element.

13. The device according to claim 11,
wherein the clamping arrangement includes a sensor device for detecting at least one position of the pusher element.

* * * * *